United States Patent
Hsu et al.

(10) Patent No.: US 7,268,500 B2
(45) Date of Patent: Sep. 11, 2007

(54) CONTROL DEVICE FOR MULTIPLE LAMP CURRENTS OF LIQUID CRYSTAL DISPLAY BACKLIGHT SOURCE

(75) Inventors: Cheng-Chia Hsu, Chupei (TW); Yun-Ching Wu, Hsinchu (TW); Teng-Kang Chang, Jhudong Township, Hsinchu County (TW)

(73) Assignee: Logah Technology Corp., Hsinchu County (TW)

( * ) Notice: Subject to any disclaimer, the term of this patent is extended or adjusted under 35 U.S.C. 154(b) by 85 days.

(21) Appl. No.: 11/335,655

(22) Filed: Jan. 20, 2006

(65) Prior Publication Data

US 2007/0170871 A1   Jul. 26, 2007

(51) Int. Cl.
*H05B 37/02* (2006.01)
*H05B 37/00* (2006.01)

(52) U.S. Cl. .................... 315/291; 315/312

(58) Field of Classification Search ............ 315/209 R, 315/210, 219, 220, 291, 299, 300, 301, 312
See application file for complete search history.

(56) References Cited

U.S. PATENT DOCUMENTS 6,310,444 B1 * 10/2001 Chang .................. 315/282
6,661,181 B2 * 12/2003 Shin ...................... 315/169.4
6,979,957 B2 * 12/2005 Lee et al. ................ 315/195
7,190,128 B2 *  3/2007 Chen et al. ............. 315/312
2005/0093472 A1 *  5/2005 Jin .......................... 315/177

* cited by examiner

*Primary Examiner*—Thuy Vinh Tran
(74) *Attorney, Agent, or Firm*—Rosenberg, Klein & Lee

(57) ABSTRACT

A control device for multiple lamp currents of a liquid crystal display (LCD) backlight source, comprising an electronic power switch, a transformer, an inverter and an integrated circuit (IC) feedback control module. The transformer has a primary side connected to the electronic power switch and a secondary side having two ends each connected to an end of a set of lamp composed of two lamps. The inverter has three sets of coil connected to the other end of the two sets of lamp. The IC feedback control module is connected between the inverter and the electronic power switch and through which currents flown through the two sets of lamp may be balanced. Meanwhile, the current flown through the inverter is feedback to the IC feedback control module by which a control signal is outputted to the electronic power switch by determining and processing the feedback current, thereby controlling an output signal from the electronic power switch. Therefore, luminance of the multiple lamps in the LCD backlight source may be controlled and maintained.

12 Claims, 4 Drawing Sheets

CONTROL DEVICE FOR MULTIPLE LAMP CURRENTS OF LIQUID CRYSTAL DISPLAY BACKLIGHT SOURCE

BACKGROUND OF THE INVENTION

1. Field of the Invention

The present invention relates to a control device for multiple lamp currents of a liquid crystal display (LCD) backlight source. More particularly, the present invention relates to a control device for multiple lamp currents of a liquid crystal display (LCD) backlight source, through which luminance of the lamps in the LCD backlight source may be maintained balanced.

2. Description of the Prior Art

Referring to FIG. 1, an architecture diagram of a conventional control circuit of multiple lamp currents in a liquid crystal display (LCD) backlight source is shown therein. As shown, the multiple lamps in the LCD backlight source are controlled in the following manner. An electronic power switch 12 is connected to a primary side of a transformer 11 and four lamps are connected at one end in parallel to a secondary side of the transformer 11. At the other end of the four lamps 13, three inverters 14 are connected at one end, which are connected to an integrated circuit (IC) feedback control module 15 at the other end. Further, the IC feedback control module 15 is connected to the electronic power switch 12. As such, the control circuit for the multiple lamps 1 is completely formed. By means of the IC feedback control module 15, a feedback current signal is detected and determined and processed. Then, a control signal is outputted to the electronic power switch 12 by which an output signal from the electronic power switch 12 is controlled, thereby achieving control and maintenance of uniform luminance of the lamps. Since N lamps in the above circuit requires N−1 inverters, a considerable limitation is caused on manufacturing cost and use of such circuit. Further, since too many components are involved in the circuit, the current balance purpose is difficult to be achieved.

In view of the above discussion, the conventional control circuit for the multiple lamps still has some shortcomings to be addressed and thus has to be improved. Accordingly, the Inventors have paid many efforts in the related research and finally developed successfully a control device for lamp currents of a LCD backlight, which is taken as the present invention.

SUMMARY OF THE INVENTION

It is, therefore, an object of the present invention to provide a control device for multiple lamp currents of a liquid crystal display (LCD) backlight source, which may efficiently balance the multiple lamp currents so that a uniform luminance may be achieved over the multiple lamps in the LCD backlight source.

It is another object of the present invention to provide a control device for the multiple lamp currents of the LCD backlight source, which is provided with the advantages of higher stability, lengthened lifetime, reduced cost, smaller transformer and saved layout space.

The control device for the multiple lamps of the LCD backlight source comprises an electronic power switch, a transformer, an inverter and an IC feedback control module. The transformer has a primary side connected to the electronic power switch and a secondary side having two ends each connected to an end of a set of lamp composed of two lamps. The inverter has three sets of coil connected to the other end of the two sets of lamp. The IC feedback control module is connected between the inverter and the electronic power switch and through which the currents flown through the two sets of lamp may be balanced. Meanwhile, the current flown through the inverter is feedback to the IC feedback control module by which a control signal is outputted to the electronic power switch by determining and processing the feedback current, thereby controlling an output signal from the electronic power switch. Therefore, luminance of the multiple lamps may be controlled and maintained.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

Figure 1:
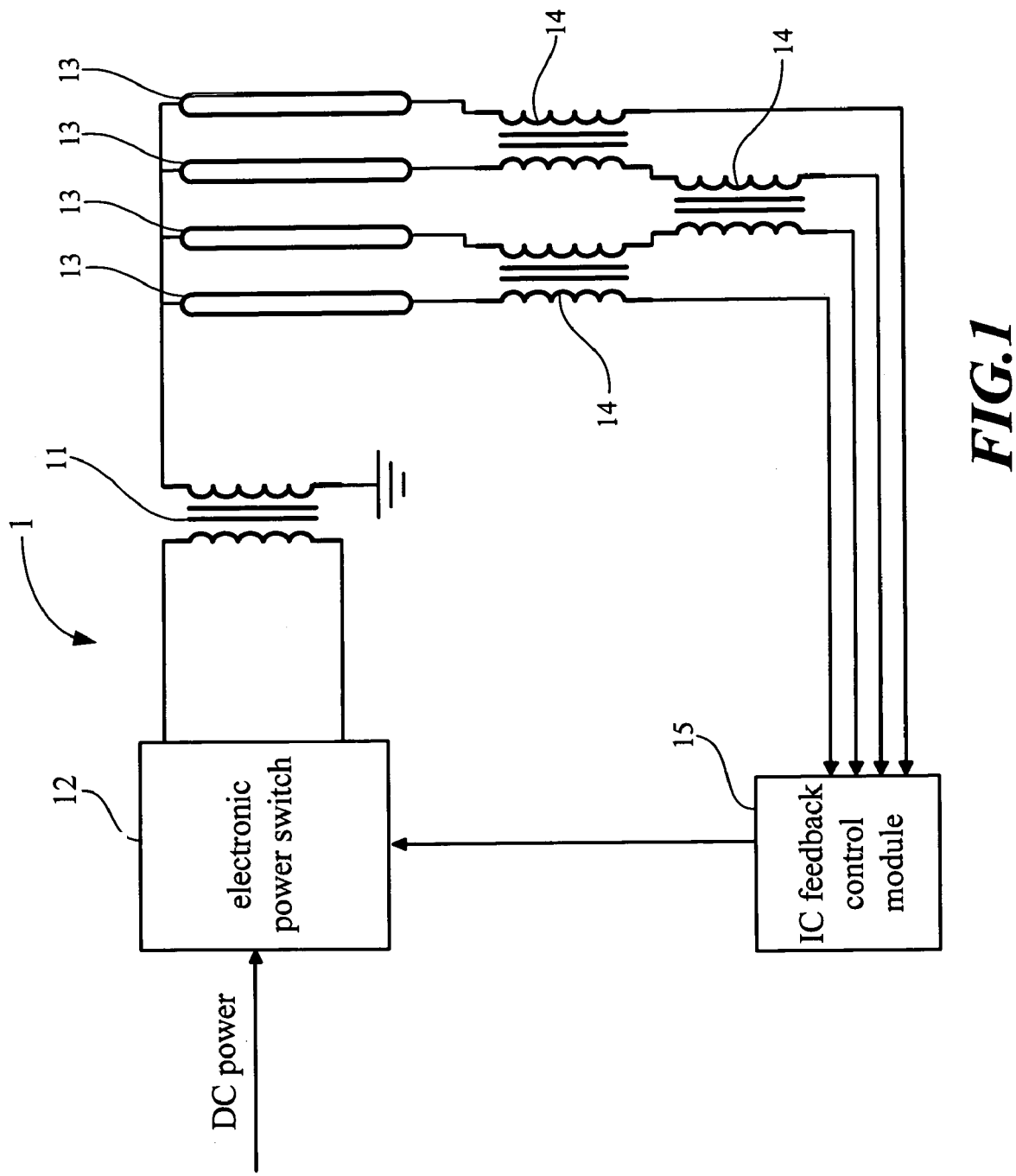
FIG. 1 is an architecture diagram of a conventional control circuit for multiple lamp currents of a liquid crystal display (LCD) backlight source.
Figure 2:
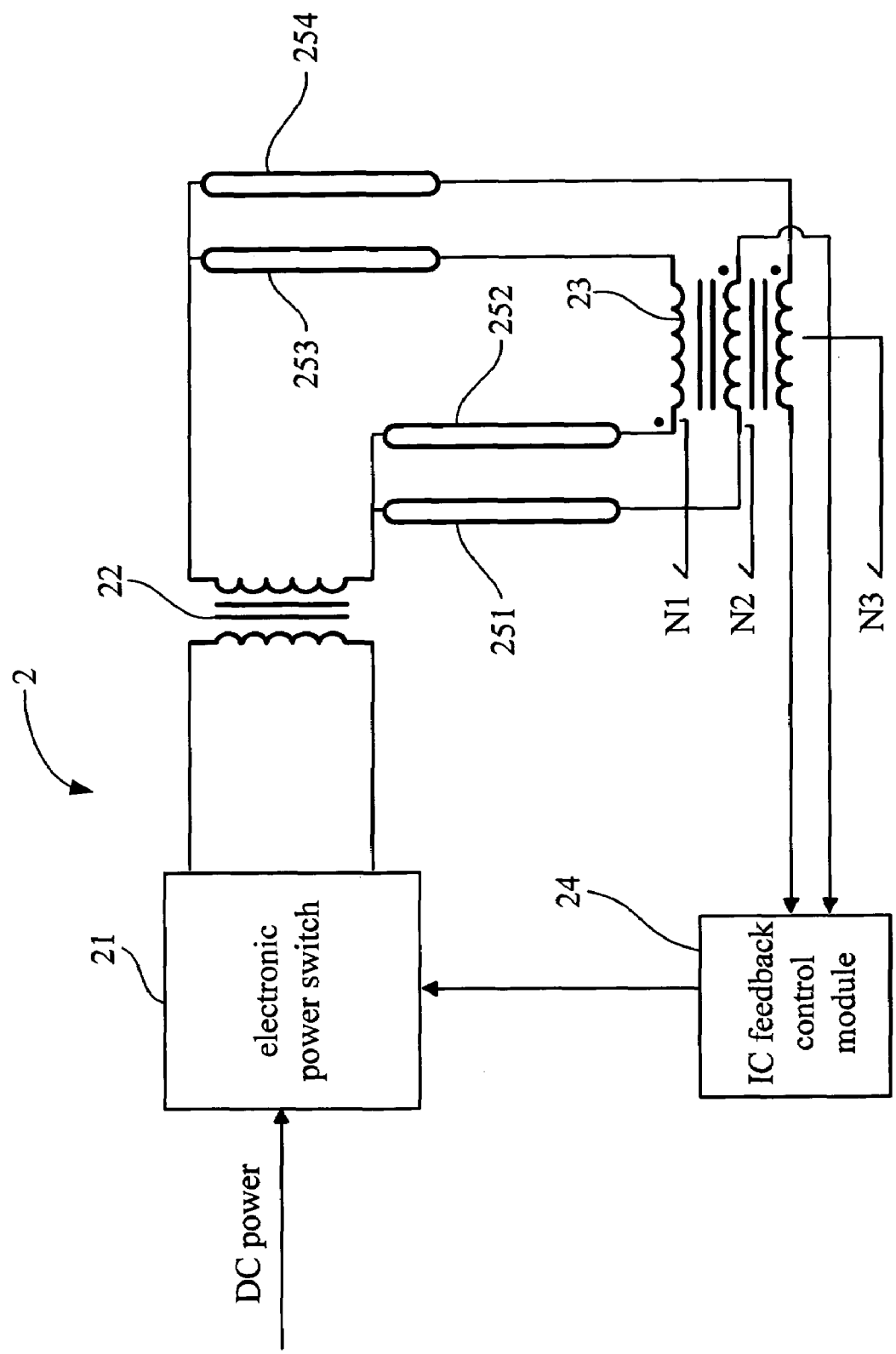
FIG. 2 is a circuit diagram of a control device for multiple lamp currents of a light liquid display (LCD) backlight source according to a first embodiment of the present invention.

Referring to FIG. 2, a circuit diagram of a control device for multiple lamp currents of a light liquid display (LCD) backlight source according to a first embodiment of the present invention is shown therein. As shown, the control device 2 comprises an electronic power switch 21, a transformer 22, an inverter 23 and an integrated circuit (IC) feedback control module 24. The transformer 22 has a primary side and a secondary side, the primary side being connected to the electronic power switch 21 and the secondary side having two ends each connected to one end of a set of lamp composed of two lamps 251,252,253,254. The other end of each of the lamps 251,252,253,254 is connected to the inverter 23 having three sets of coil, N1, N2 and N3, wherein N1=N2+N3 and preferably N1:N2:N3=2:1:1. The first, second, third and fourth lamps 251,252,253,254 are connected to an output end of the coil N2, an input end of the coil N1, an output end of the coil N1 and an input end of the coil N3, respectively. Further, an input end of the coil N2 and an output end of the coil N3 are connected to the IC feedback control module 24 so that the IC feedback control module 24 is connected between the inverter 23 and the electronic power switch 21. By means of the inverter 23, the current flown through each of the four lamps 251,252,253, 254 is balanced. Then, the current of the inverter 23 is feedback to the IC feedback control module 24 and determined and processed therein and the IC feedback control module 24 outputs a control signal to the electronic power switch 21 so as to control the signal issued from the electronic power switch 21. As such, the luminance of the multiple lamps may be controlled and maintained.

Figure 3:
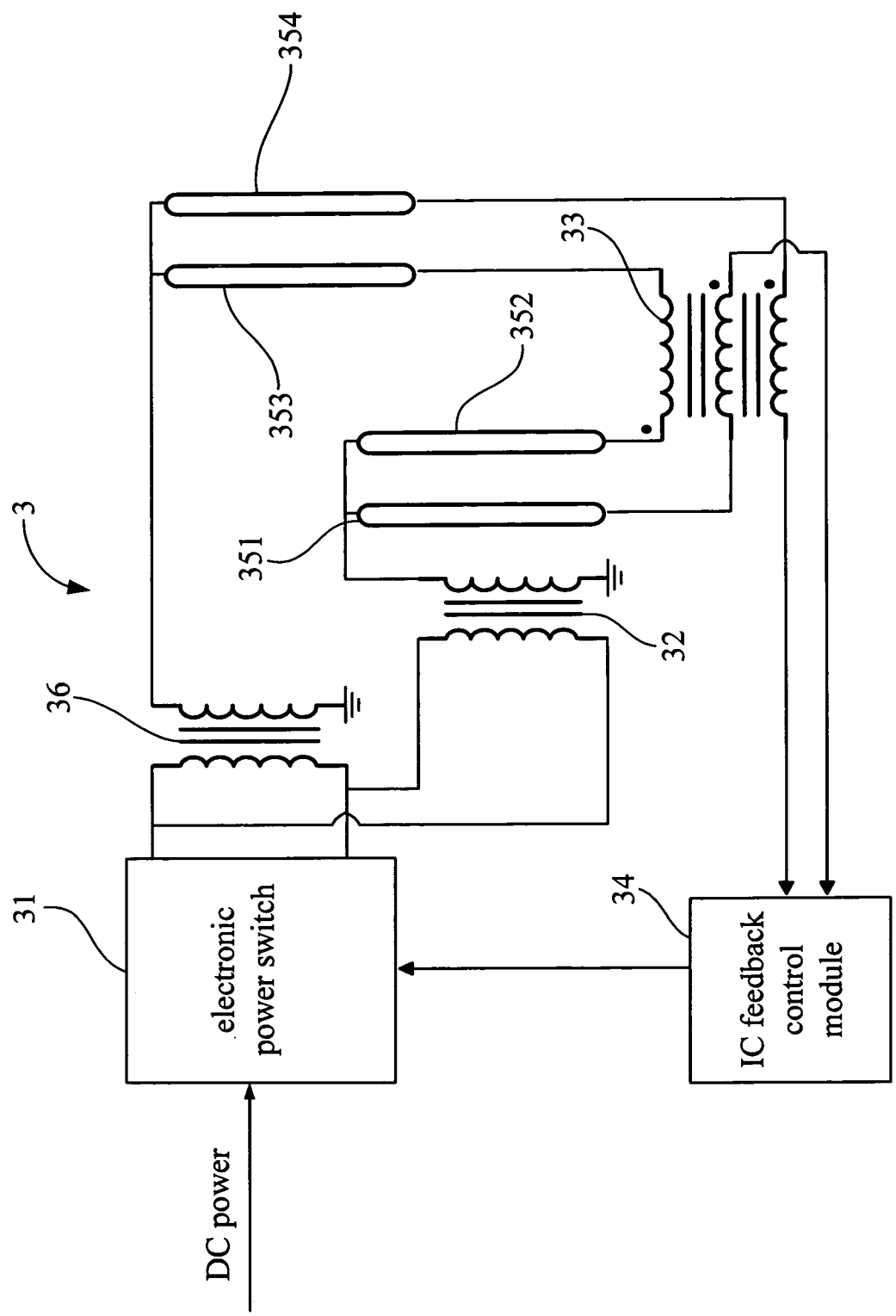
FIG. 3 is a circuit diagram of the control device for the multiple lamp currents of the LCD backlight source according to a second embodiment of the present invention.

Referring to FIG. 3, a circuit diagram of the control device for the multiple lamp currents of the light liquid display (LCD) backlight source according to a second embodiment of the present invention is shown therein. As shown, the control device 3 comprises an electronic power switch 31, transformers 32,36, an inverter 33 and an IC feedback control module 34. The transformer 32 has a primary side and a secondary side, the primary side being connected to the electronic power switch 31 and the secondary side connected to one end of a set of lamp composed of two lamps 353,354. The other end of each of the lamps 351,352, 353,354 is connected to the inverter 33 having three sets of coil, N1, N2 and N3, having a preferable relationship N1:N2:N3=2:1:1. The first, second, third and fourth lamps 351,352,353,354 are connected to an output end of the coil N2, an input end of the coil N1, an output end of the coil N1 and an input end of the coil N3, respectively. Further, the input end of the coil N2 and the output end of the coil N3 are connected to the IC feedback control module 34 so that the IC feedback control module 34 is connected between the inverter 33 and the electronic power switch 31. By means of the inverter 33, a current flown through each of the four lamps 351,352,353,354 is balanced. Then, the current of the inverter 33 is feedback to the IC feedback control module 34 and determined and processed therein and the IC feedback control module 34 outputs a control signal to the electronic power switch 31 so as to control the signal issued from the electronic power switch 31. As such, the luminance of the multiple lamps may be controlled and maintained.

Figure 4:
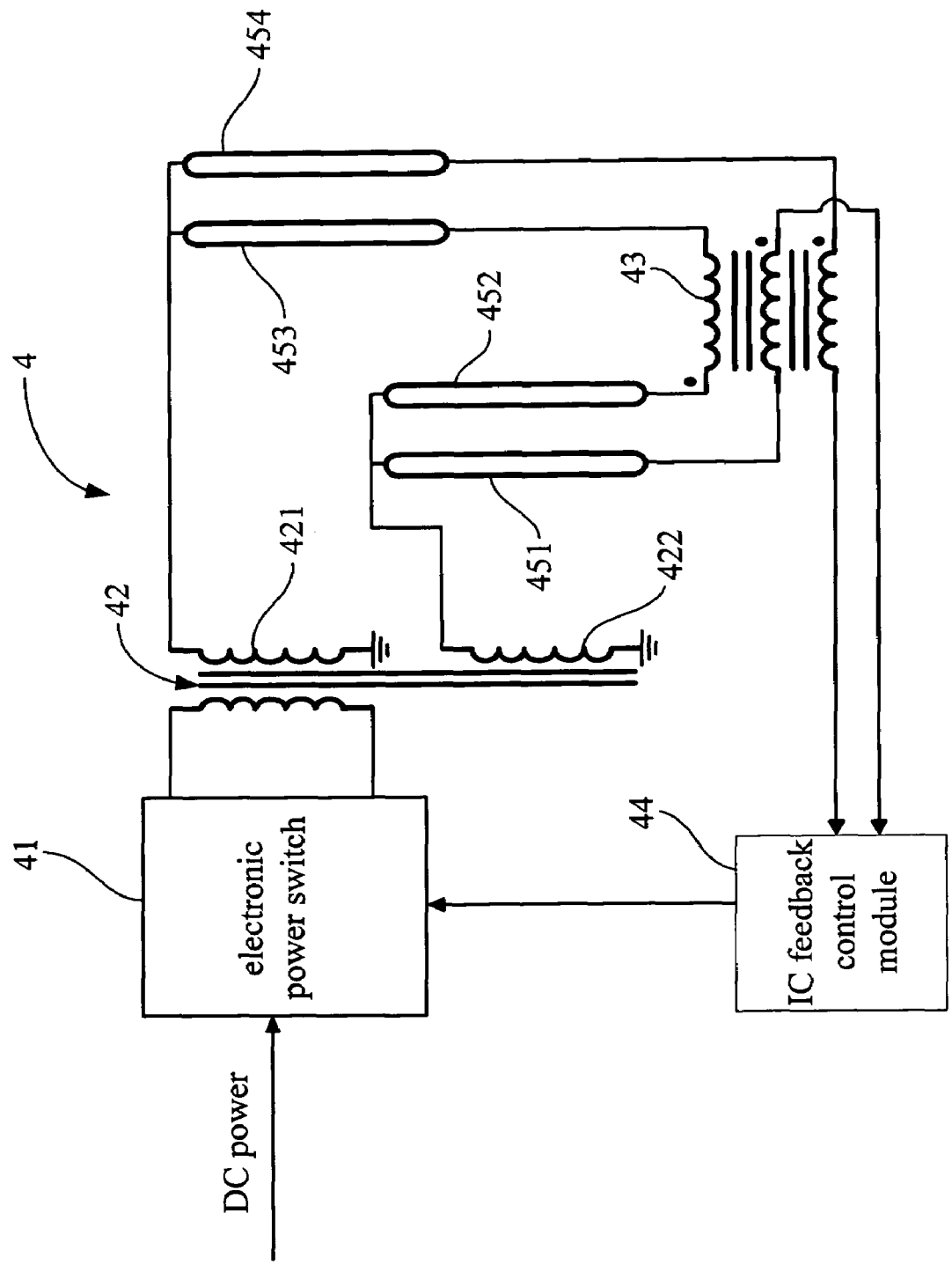
FIG. 4 is a circuit diagram of the control device for the multiple lamp currents of the LCD backlight source according to a first embodiment of the present invention.

Referring to FIG. 4, a circuit diagram of the control device for the multiple lamp currents of the light liquid display (LCD) backlight source according to a third embodiment of the present invention is shown therein. As shown, the control device 4 comprises an electronic power switch 41, transformers 32,36 each having two output coils, an inverter 43 and an IC feedback control module 44. The transformer 42 has a primary side, an output coil 421 and a second output coil 422, the primary side being connected to the electronic power switch 41, the first coil 421 being connected to two lamps 453,454 and the second coil 422 being connected to two lamps 451,452. The other end of each of the lamps 451,452,453,454 are connected to the inverter 43 having three sets of coil, N1, N2 and N/3, wherein N1=N2+N3 and preferably N1:N2:N3=2:1:1. The first, second, third and fourth lamps 451,452,453,454 are each connected to an output end of the coil N2, an input end of the coil N1, an output end of the coil N1 and an input end of the coil N3, respectively. Further, the input end of the coil N2 and the output end of the coil N3 are connected to the IC feedback control module 44 so that the IC feedback control module 44 is connected between the inverter 43 and the electronic power switch 43. By means of the inverter 43, a current flown through each of the four lamps 451,452,453,454 is balanced. Then, a current of the inverter 43 is feedback to the IC feedback control module 44 and determined and processed therein and the IC feedback control module 44 outputs a control signal to the electronic power switch 41 so as to control the signal issued from the electronic power switch 41. As such, the luminance of the lamps may be controlled and maintained.

<Features and Efficacies>

As compared to the prior art, the control device for the multiple lamp currents of the LCD backlight source provides at least the following merits: 1. The multiple lamp currents in the LCD backlight source may be efficiently balanced and luminance of the lamps may be controlled and maintained. 2. The control device for the multiple lamp currents of the LCD backlight source is provided with the advantages of higher stability, lengthened lifetime, reduced cost, smaller transformer and saved layout space.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A control device for multiple lamps of a liquid crystal display (LCD) backlight source, comprising:
   an electronic power switch receiving a direct current (DC) power signal;
   a transformer having a primary side connected to the electronic power switch and a secondary side having two ends each connected to one end of a set of lamp composed of two lamps;
   an inverter having three sets of coil (N1, N2 and N3) connected to the other end of the two sets of lamps to output a status signal; and
   an integrated circuit (IC) feedback control module receiving the status signal from the inverter and determining and processing the status signal to output a control signal to the electronic power switch so as to control the signal outputted from the electronic power switch and thus control and maintain a luminance of the lamps.

2. The control device according to claim 1, wherein the three sets of coil of the inverter has a relationship of N1=N2+N3.

3. The control device according to claim 2, wherein the relationship is N1:N2:N3=2:1:1.

4. The control device according to claim 1, wherein the first lamp is connected to an output end of the coil N2, the second lamp is connected to an input end of the coil N1, the third lamp is connected to an output end of the coil N1, the fourth lamp is connected to an input end of the coil N3 and an input end of the coil N2 and an output end of the coil N3 are connected to the IC feedback control module.

5. A control device for multiple lamp currents of a light liquid display (LCD) backlight source, comprising:
   an electronic power switch receiving a direct current (DC) power signal;
   a first transformer and a second transformer each having a primary side connected to the electronic power switch and a secondary side, the secondary side of the first transformer being connected to one end of a first lamp and a second lamp forming a set of lamp and the secondary side of the second transformer being connected to one end of a third lamp and a fourth lamp forming another set of lamp;
   an inverter having three sets of coil (N1, N2 and N3) and being connected to the first, second, third and fourth lamps at the other end and outputting a status signal; and
   an integrated circuit (IC) feedback control module receiving the status signal from the inverter to determine and process the status signal to generate a control signal, the control signal being outputted to the electronic power switch so as to control the signal outputted from the electronic power switch and thus control and maintain a luminance of the lamps.

6. The control device according to claim 5, wherein the three set of coil of the inverter has a relationship of N11=N2+N3.

7. The control device according to claim 6, wherein the relationship is N1:N2:N3=2:1:1.

8. The control device according to claim 5, wherein the first lamp is connected to an output end of the coil N2, the second lamp is connected to an input end of the coil N1, the third lamp is connected to an output end of the coil N1, the fourth lamp is connected to an input end of the coil N3 and an input end of the coil N2 and an output end of the coil N3 are connected to the IC feedback control module.

9. A control device for multiple lamp currents of a light liquid display (LCD) backlight source, comprising:

an electronic power switch receiving a direct current (DC) power signal;

a first transformer having a first output coil connected to a third lamp and a fourth lamp, a second output coil connected to a first lamp and a second lamp, a primary side connected to the electronic power device and a secondary side;

an inverter having three sets of coil (N1, N2 and N3) and being connected to the first, second, third and fourth lamps at the other end and outputting a status signal; and an integrated circuit (IC) feedback control module receiving the status signal from the inverter to determine and process the status signal to generate a control signal, the control signal being outputted to the electronic power switch so as to control the signal outputted from the electronic power switch and thus control and maintain a luminance of the lamps.

10. The control device according to claim 9, wherein the three sets of coil of the inverter has a relationship of N1=N2+N3.

11. The control device according to claim 10, wherein the relationship is N1:N2:N3=2:1:1.

12. The control device according to claim 9, wherein the first lamp is connected to an output end of the coil N2, the second lamp is connected to an input end of the coil N1, the third lamp is connected to an output end of the coil N1, the fourth lamp is connected to an input end of the coil N3 and an input end of the coil N2 and an output end of the coil N3 are connected to the IC feedback control module.

* * * * *